United States Patent [19]

Tanaka et al.

[11] Patent Number: 4,544,250
[45] Date of Patent: Oct. 1, 1985

[54] OPTICAL SYSTEM FOR CAMERA WITH A VIEWFINDER

[75] Inventors: Kazuo Tanaka, Tokyo; Sadahiko Tsuji, Kanagawa, both of Japan

[73] Assignee: Canon Kabushiki Kaisha, Tokyo, Japan

[21] Appl. No.: 613,590

[22] Filed: May 23, 1984

[51] Int. Cl.$^4$ .................. G03B 13/08; G03B 13/12
[52] U.S. Cl. .................................. 354/199; 354/224; 358/224
[58] Field of Search ............... 354/199, 200, 201, 219, 354/222, 224, 225; 352/142, 140; 358/224

[56] References Cited

U.S. PATENT DOCUMENTS

| | | | |
|---|---|---|---|
| 3,665,834 | 5/1972 | Loewe | 354/199 |
| 3,738,245 | 6/1973 | Theer | 354/199 |
| 3,914,034 | 10/1975 | Komine | 354/199 |
| 4,000,501 | 12/1976 | Sakaguchi et al. | 354/199 |
| 4,072,971 | 2/1978 | Kuboshima | 354/199 |
| 4,432,626 | 2/1984 | Ohtake | 354/225 |

*Primary Examiner*—A. A. Mathews
*Attorney, Agent, or Firm*—Toren, McGeady, Stanger, Goldberg & Kiel

[57] ABSTRACT

A photographic optical system including a beam splitter for a finder is provided with a releasably attached extender in between the beam splitter and a focal plane, while the finder is provided with means for changing the magnification of an image thereof as the extender is inserted into, or retracted from, axial alignment to the optical system. The camera has, despite the addition of the magnification power changing capability along with the finder image magnification correcting capability, to be made small in the size and light in the weight.

6 Claims, 18 Drawing Figures

LATERAL ABERRATION

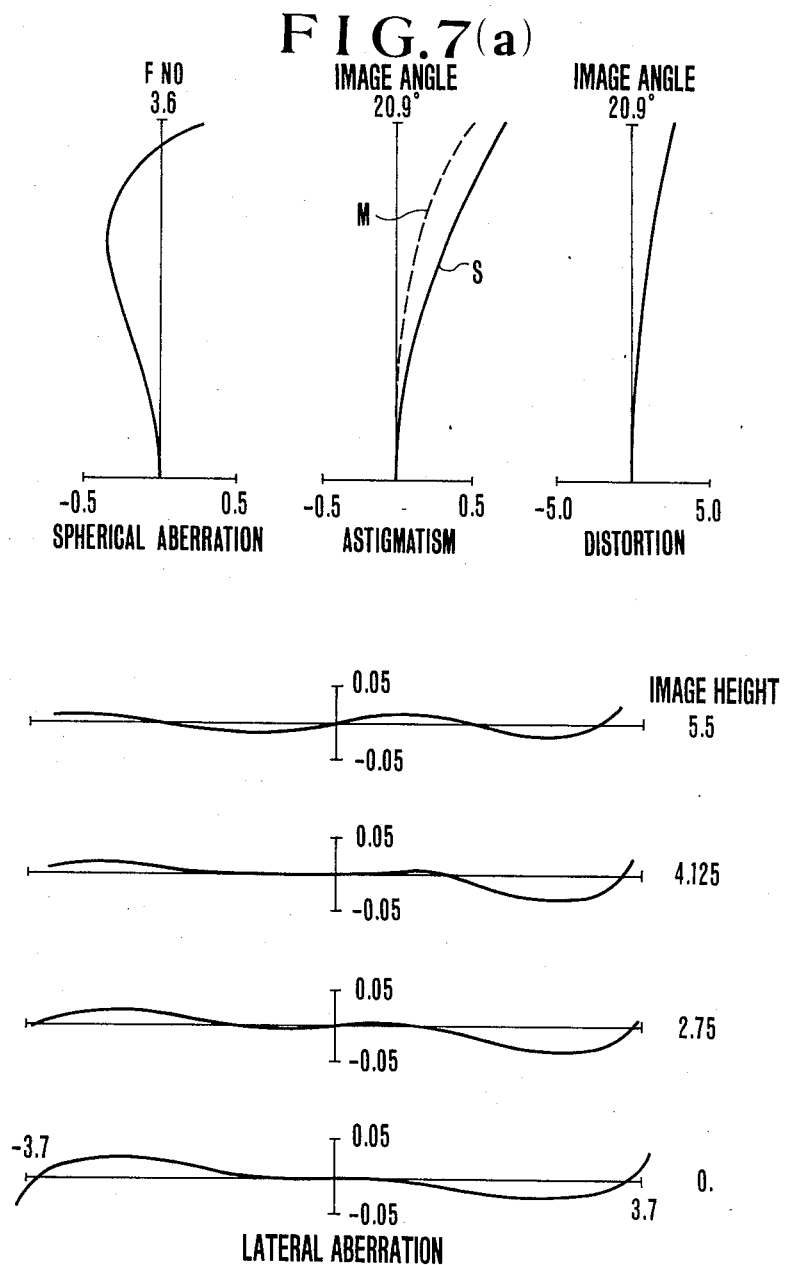

OPTICAL SYSTEM FOR CAMERA WITH A VIEWFINDER

BACKGROUND OF THE INVENTION

1. Field of the Invention

This invention relates to an optical system for a camera.

2. Description of the Prior Art

The optical systems for video cameras and cine cameras, for example, have the general configuration shown in FIG. 1 where 1 is a zoom section constituting part of a photographic optical system of the camera. This zoom section 1 is rearwardly followed by a beam splitter 2, a diaphragm 3, a relay section 4 of components 4a and 4b of the zoom lens, and an image pickup element 5 along an optical axis of the zoom section 1 in this order from the front. The image pickup element 5 takes the form of, in the instance of video cameras, a charge coupled device (CCD) or like image sensor, and in the instance of cine cameras, a photographic film. The light emerging from the zoom section 1 is split off by a half-mirrored layer 2a in the beam splitter 2 to an upward going portion with an axis L2 on which lies a finder optical system. The finder system comprises, in a direction of advance of light, an objective lens 6, a total reflection mirror 7 for bending the optical axis L2 to parallelism with the first optical axis L1, a field lens 8, an erector lens 9, a field mask 10, and an eye-piece composed of lenses 11a and 11b.

Here, the light passing through the zoom section 1, splitter 2, diaphragm 3 and relay section 4 forms an image of an object being photographed on the image pickup element 5 arranged in the focal plane. The split-off light L2 by the splitter 2, on the other hand, passes through the objective lens 6 to the total reflection mirror 7 and therefrom is reflected to the field lens 8, forming a first image at a plane P1. This image is erected by the lens 9 at a second focal plane P2 of the finder optical system, or the field mask 10. This erected image is observed through the eye-piece 11.

In the optical system of this configuration, because the beam splitter 2 for giving the finder optical system an image bearing light beam is positioned between the zoom section 1 and the diaphragm 3, changing of the angular field with zooming and focusing by the front members of the zoom section 1 can be observed always clearly no matter what aperture value the diaphragm 3 may take. Such optical system has, therefore, found its use in many video cameras and cine cameras.

Meanwhile, it is also known to provide the so-called extender which when inserted into either a rear or an intermediate space of the photographic optical system, in the case of its being a zoom lens, shifts the range of focal lengths that can be set on that zoom lens, or in the case of its being a fixed focal length lens, changes its focal length from one to another value. Because the extender is smaller in the size and lighter in the weight than the afocal converter which effects an equivalent result when it is attached to the front of the photographic optical system, it is applied to various types of optical systems for cameras.

By the way, the application of such extender to the optical system of the type illustrated in FIG. 1 gives rise to a disadvantage as described below. That is, as the extender is inserted into a space between the components 4a and 4b constituting the relay section 4, the angular field of the finder does not change at all. The use of the extender results in creating a difference between the angles of view field for the image pickup element 5 and the field mask 10. To solve this, for example, a method of interchanging the field mask 10 may be employed. But, for the focal length is increased, the size of area of the frame is decreased. Therefore, visual zooming and focusing become very difficult to perform.

SUMMARY OF THE INVENTION

An object of the present invention is to provide a novel optical system for a camera capable of correcting the field of view of an optical finder in response to change in the focal length of a photographic optical system.

Another object is to provide an optical system for a camera which accomplishes the above-stated object without involving an unduly large increase in the bulk and size and the weight.

These and other objects of the invention will become apparent from the following description of embodiments thereof.

BRIEF DESCRIPTION OF THE DRAWINGS

FIGS. 7(a) to 7(c) are graphic representations of the aberrations of the photographic optical system of FIG. 4(b) in the shortest, intermediate and longest focal length positions respectively.

DETAILED DESCRIPTION OF THE PREFERRED EMBODIMENTS

Figure 1:
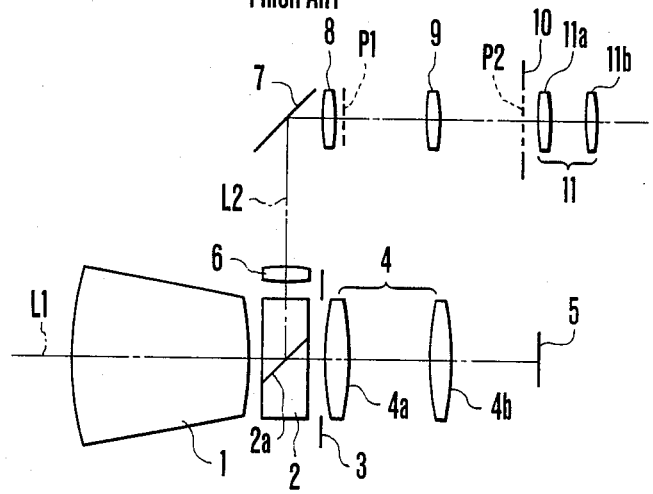
FIG. 1 is a schematic sectional view of an optical system of the general configuration for a camera.

The present invention will next be described based on embodiments illustrated in FIG. 2 and those that follow, where the similar parts to those shown in FIG. 1 are referred to by the same symbols and their explanation is not recited here.

Figure 2:
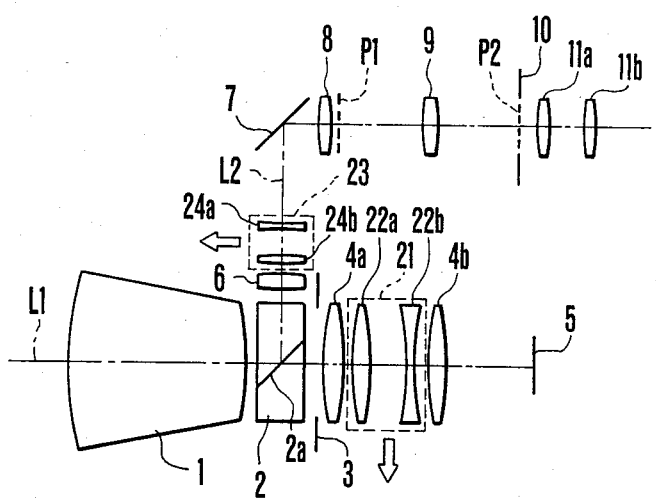
FIG. 2 is similar to FIG. 1 except that an embodiment of the present invention is illustrated.

In FIG. 2, two lenses 22a and 22b constitute an extender for use in the photographic optical system. This extender 21 is movably supported by a mechanism (not shown) to releasably attach in between the components 4a and 4b which constitute the relay section 4, as illustrated in FIG. 2. The finder optical system is also provided with an extender 23 of its own which has an euqal magnification power to that of the extender 21, and which is constructed with lenses 24a and 24b. When the extender 21 is inserted into and seated in axial alignment with the photographic optical system, the extender 23 is also caused to take its place behind the objective lens 6 by an operating mechanism (not shown) therefor.

With the extenders 21 and 23 when in use, on the other hand, an enlarged object image is formed on the light receiving surface of the image pickup element 5, and at the same time the finder image at the first focal plane P1 is enlarged to the same rate as that of magnification of the image of the photographic optical system. This makes it possible for the photographer to observe the finder image of the same field of view as the actual one for the image pickup element 5.

Next, using FIGS. 3(a) and 3(b), other embodiments of the invention will be described.

Figure 3A:
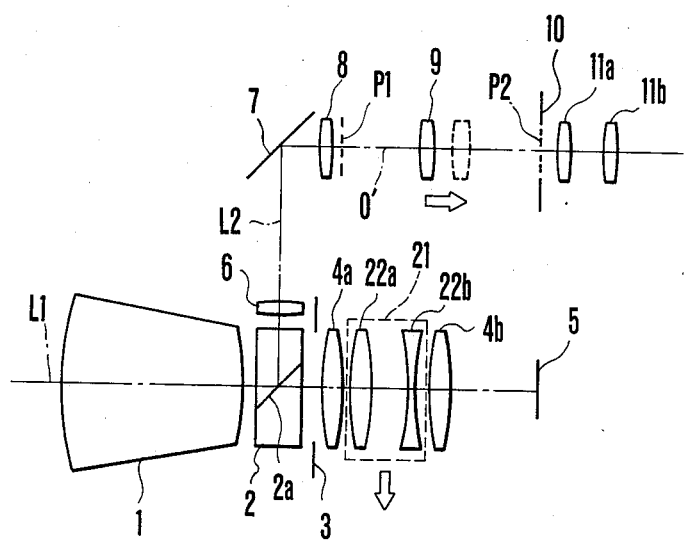
FIGS. 3(a) and 3(b) illustrate another embodiments of the invention.

In the embodiment of FIG. 3(a), the extender 21 is arranged to move into or retract from a space between the components 4a and 4b in the relay section 4. Responsive to this movement of the extender 21 in a direction perpendicular to the optical axis L1, the erector lens 9 is otherwise made movable along the optical axis O' of the finder optical system, thus also serving as the extender for the finder image.

With the extender 21 when, for example in use with the photographic optical system as illustrated in FIG. 3(a), the erector lens 9 assumes a position indicated by the solid line as changed from another position indicated by the dashed line with the extender 21 is inserted, thereby the image at the second focal plane P2 is changed. Under this condition, for a given image magnification, "a", of the extender 21, the magnification power of the erector lens 9 is so chosen to take a value of $-\sqrt{a}$ times in the solid line position and $-1/\sqrt{a}$ in the dashed line position. So the distance between the first and second focal planes P1 and P2 may be left unchanged without having to produce any change of the visual angle.

Figure 3B:
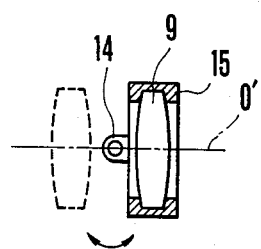

Changing of the axial position of the erector lens 9 may be otherwise carried out as shown in FIG. 3(b) where a holder 15 for the erector lens 9 is rotatable about an axis 14 perpendicular to the optical axis O' and is arranged to turn 180° when the extender 21 is advanced or retracted, thus taking the dashed position.

It will be understood that according to this embodiment, by a very simple method of moving the erector lens 9 which is primarily one of the constituent parts of the finder optical system, it is made possible to increase the magnification of the finder image in response to increase in the focal length of the photographic optical system, thereby giving an advantage that the number of parts added is limited to a minimum while nevertheless achieving a perfect operation of the finder function. It is to be noted that in order to maintain a good performance of the finder optical system, the erector lens 9 is preferably constructed as including a cemented doublet consisting of a positive lens element and a negative lens element. It should be pointed out here that instead of using the erector lens 9, the objective lens 6 can be selected to also serve as the extender axially movable in response to movement of the extender 21. Even in this case, it is possible to obtain an enlarged image in the finder optical system with the same rate of magnification as that of magnification in the photographic optical system.

Figure 4A:
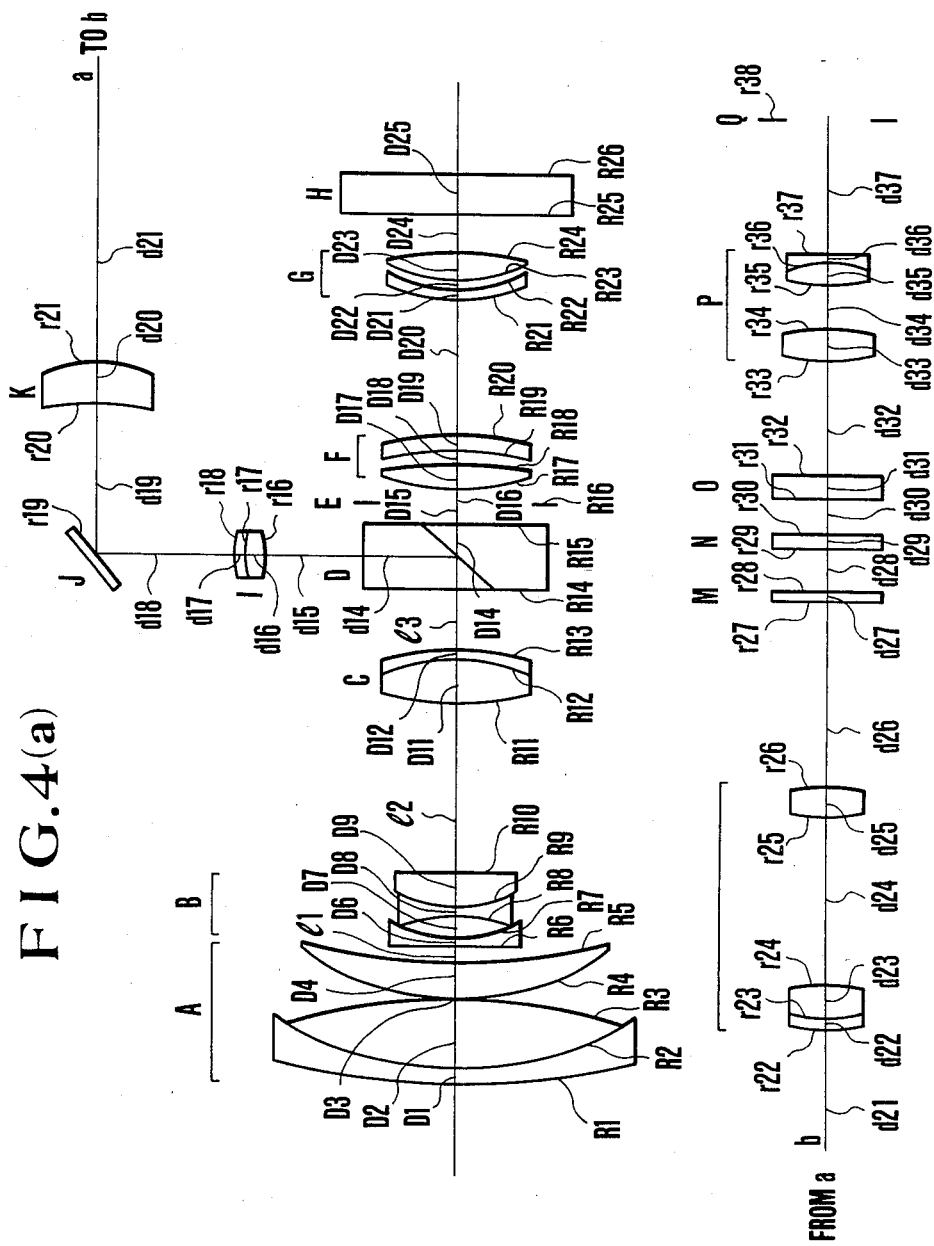
FIGS. 4(a) and 4(b) are lens block diagrams of a numerical specific example of the optical system of the invention with and without an extender respectively.

An example of a specific optical system of the invention can be constructed in accordance with the numerical data given in Tables 1 to 4 below. In Tables 1 and 2 for the photographic and finder optical systems respectively but with exclusion of their extenders as illustrated in FIG. 4(a), A denotes a focusing lens, B a variator, C a compensator, D a prism for finder, E a diaphragm, F a front part of a relay lens, G a rear part of the relay lens, H a face plate, I an objective lens, J a mirror, K a field lens, L an erector lens, M a filter, N a field mask, O a filter, P an eye-piece, and Q an eye point. Also Ri and ri are the radii of curvature of the i-th lens surfaces counting from front; Di and di are the i-th axial thicknesses or air separations, and Ni and νi are the refractive index for the spectral d line of sodium and the Abbe number of the i-th lens element respectively.

TABLE 1

| | | | | |
|---|---|---|---|---|
| A | R1 = 87.78 | D1 = 2.00 | N1 = 1.80518 | ν1 = 25.4 |
| | R2 = 36.48 | D2 = 7.90 | N2 = 1.58913 | ν2 = 61.0 |
| | R3 = −98.96 | D3 = 0.15 | | |
| | R4 = 28.34 | D4 = 4.80 | N3 = 1.58913 | ν3 = 61.0 |
| | R5 = 92.83 | D5 = 11 | | |
| B | R6 = −743.00 | D6 = 0.90 | N4 = 1.69700 | ν4 = 48.5 |
| | R7 = 12.49 | D7 = 2.88 | | |
| | R8 = −16.90 | D8 = 0.90 | N5 = 1.69350 | ν5 = 53.2 |
| | R9 = 12.94 | D9 = 4.00 | N6 = 1.80518 | ν6 = 25.4 |
| | R10 = −860.62 | D10 = 12 | | |
| C | R11 = 39.17 | D11 = 5.20 | N7 = 1.62374 | ν7 = 47.1 |
| | R12 = −17.26 | D12 = 0.90 | N8 = 1.80518 | ν8 = 25.4 |
| | R13 = −42.56 | D13 = 13 | | |
| D | R14 = 0.0 | D14 = 7.50 | N9 = 1.51633 | ν9 = 64.1 |
| | R15 = 0.0 | D15 = 2.00 | | |
| E | R16 = 0.0 | D16 = 2.50 | | |
| F | R17 = 31.30 | D17 = 2.70 | N10 = 1.71300 | ν10 = 53.8 |
| | R18 = −65.65 | D18 = 1.80 | | |
| | R19 = −27.22 | D19 = 1.60 | N11 = 1.80518 | ν11 = 25.4 |
| | R20 = −46.68 | D20 = 16.00 | | |
| G | R21 = 21.08 | D21 = 0.90 | N12 = 1.84666 | ν12 = 23.9 |
| | R22 = 12.95 | D22 = 1.50 | | |
| | R23 = 16.98 | D23 = 2.80 | N13 = 1.69680 | ν13 = 55.5 |
| | R24 = −80.24 | D24 = 5.00 | | |
| H | R25 = 0.0 | D25 = 5.00 | N14 = 1.51633 | ν14 = 64.1 |
| | R26 = 0.0 | D26 = 5.00 | | |

| | Shortest Focal Length Position | Middle Focal Length Position | Longest Focal Length Position |
|---|---|---|---|
| f | 13.34 | 36.02 | 63.38 |
| l1 | 1.53 | 16.34 | 20.10 |
| l2 | 20.04 | 11.62 | 1.48 |
| l3 | 7.28 | 0.88 | 7.27 |

TABLE 2

| | | | | |
|---|---|---|---|---|
| D | r14 = 0.0 | d14 = 13.00 | N14 = 1.51633 | ν14 = 64.1 |
| | r15 = 0.0 | d15 = 13.02 | | |
| I | r16 = 26.42 | d16 = 1.91 | N15 = 1.62374 | ν15 = 47.1 |
| | r17 = −10.39 | d17 = 1.00 | N16 = 1.80518 | ν16 = 25.4 |
| | r18 = −30.19 | d18 = 17.00 | | |
| J | r19 = 0.0 | d19 = 17.73 | | |

TABLE 2-continued

| | | | | | |
|---|---|---|---|---|---|
| K | r20 = −34.87 | d20 = 5.03 | N17 = 1.53256 | ν17 = 45.9 | |
| | r21 = 11.66 | d21 = 54.07 | | | |
| L | r22 = 28.28 | d22 = 1.40 | N18 = 1.72825 | ν18 = 28.5 | |
| | r23 = 13.75 | d23 = 3.50 | N19 = 1.51633 | ν19 = 64.1 | |
| | r24 = −52.05 | d24 = 20.50 | | | |
| | r25 = 28.56 | d25 = 3.00 | N20 = 1.50137 | ν20 = 56.4 | |
| | r26 = −59.50 | d26 = 22.01 | | | |
| M | r27 = 0.0 | d27 = 1.35 | N21 = 1.52300 | ν21 = 58.6 | |
| | r28 = 0.0 | d28 = 5.00 | | | |
| N | r29 = 0.0 | d29 = 1.70 | N22 = 1.49171 | ν22 = 57.4 | |
| | r30 = 0.0 | d30 = 3.86 | | | |
| O | r31 = 0.0 | d31 = 3.00 | N23 = 1.52300 | ν23 = 58.6 | |
| | r32 = 0.0 | d32 = 13.27 | | | |
| P | r33 = 29.47 | d33 = 3.70 | N24 = 1.51633 | ν24 = 64.1 | |
| | r34 = −29.47 | d34 = 5.14 | | | |
| | r35 = 22.34 | d35 = 2.65 | N25 = 1.57135 | ν25 = 53.0 | |
| | r36 = −11.90 | d36 = 1.05 | N26 = 1.74077 | ν26 = 27.8 | |
| | r37 = −153.09 | d37 = 15.30 | | | |
| Q | r38 = 1.0 | d38 = 0.0 | | | |

| | Shortest Focal Length Position | Middle Focal Length Position | Longest Focal Length Position |
|---|---|---|---|
| Angular Magnification | 0.52 | 1.41 | 2.48 |

Figure 5A:
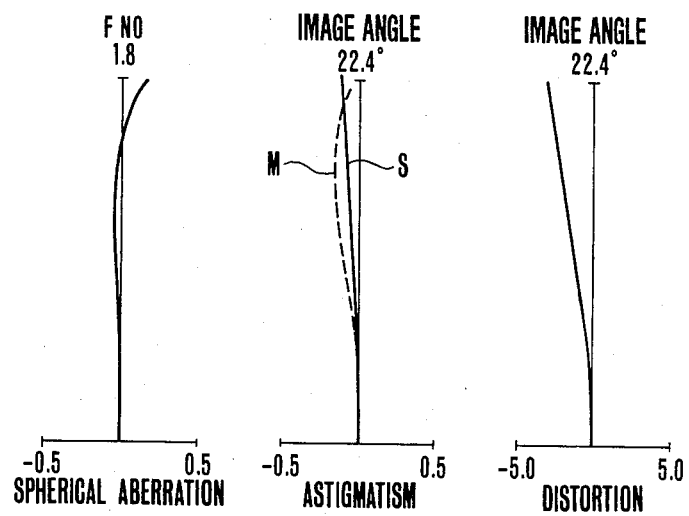
FIGS. 5(a) to 5(c) are graphic representations of the aberrations of the photographic optical system in the shortest, intermediate and longest focal length positions respectively.
Figure 5A:
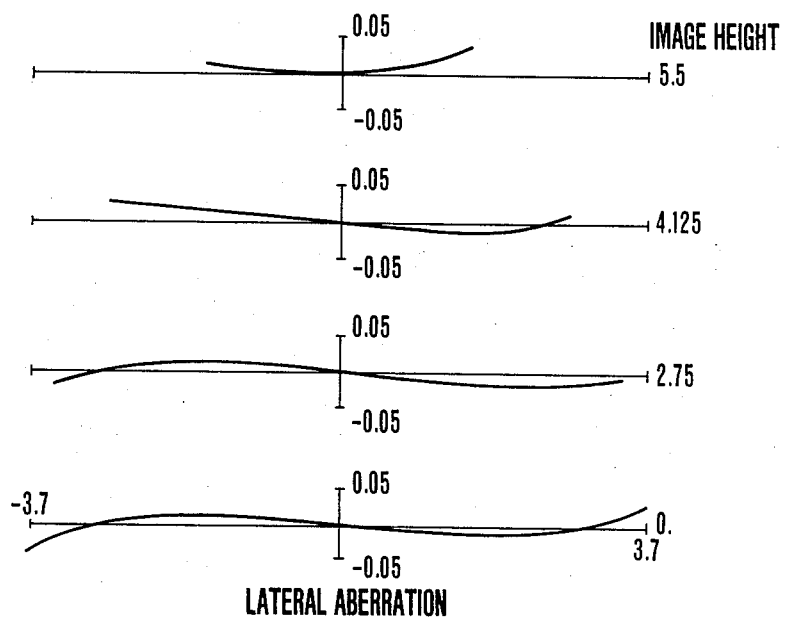
Figure 5B:
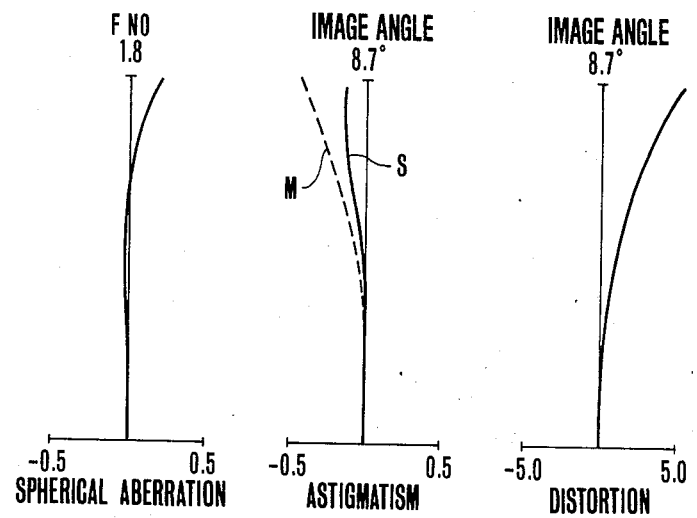
Figure 5B:
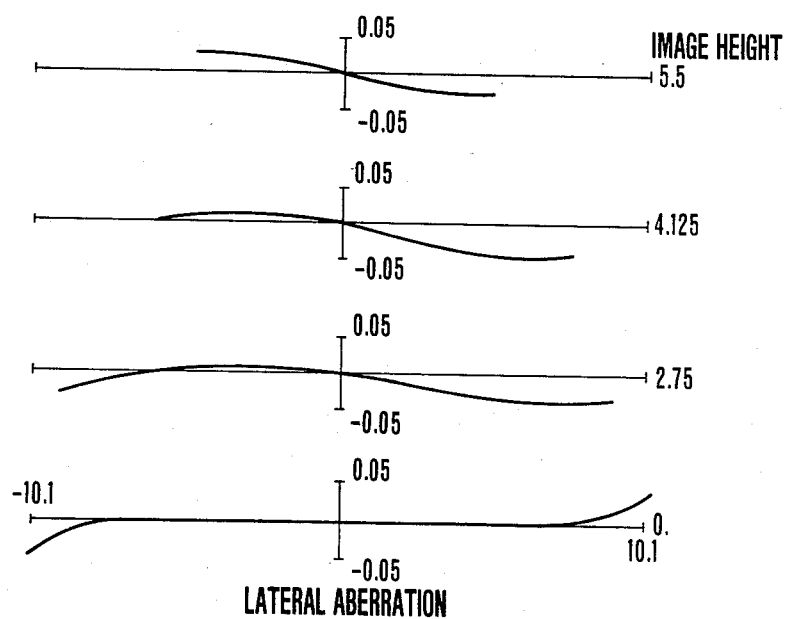
Figure 5C:
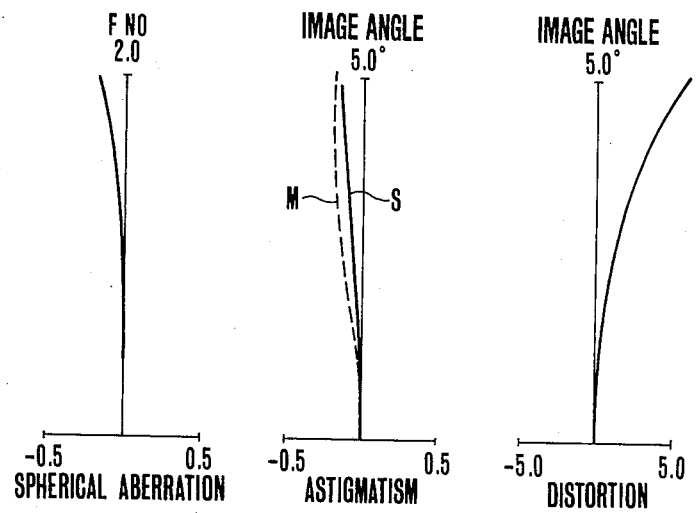
Figure 5C:
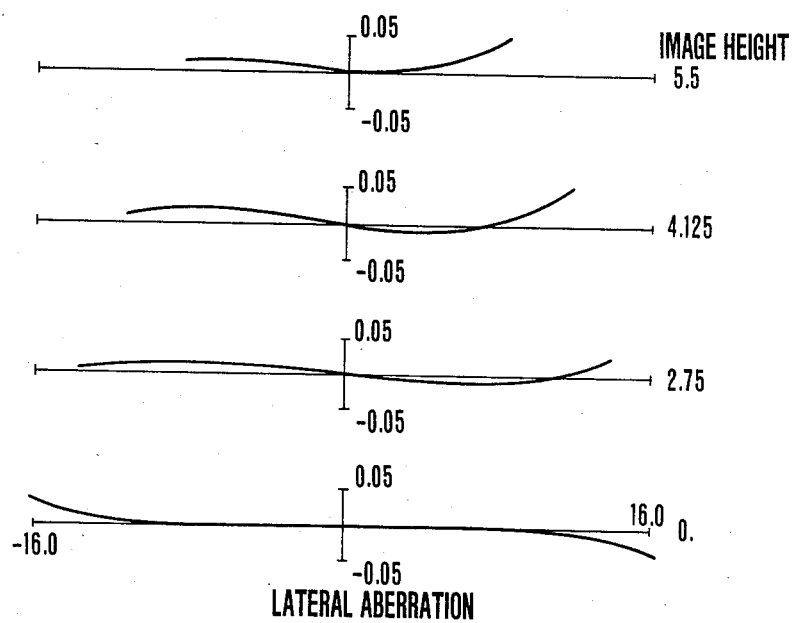
Figure 6A:
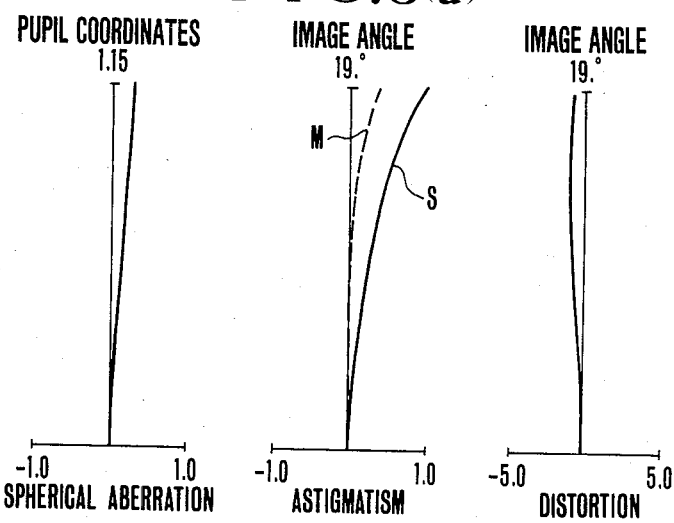
FIGS. 6(a) to 6(c) are graphic representations of the aberrations of the finder optical system of FIG. 4(a) in the shortest, intermediate and longest focal length positions respectively.
Figure 6A:
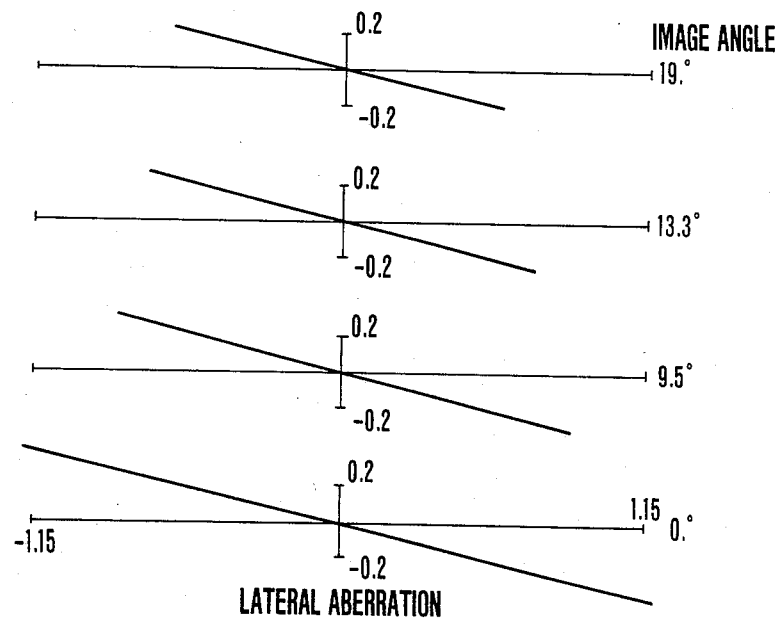
Figure 6B:
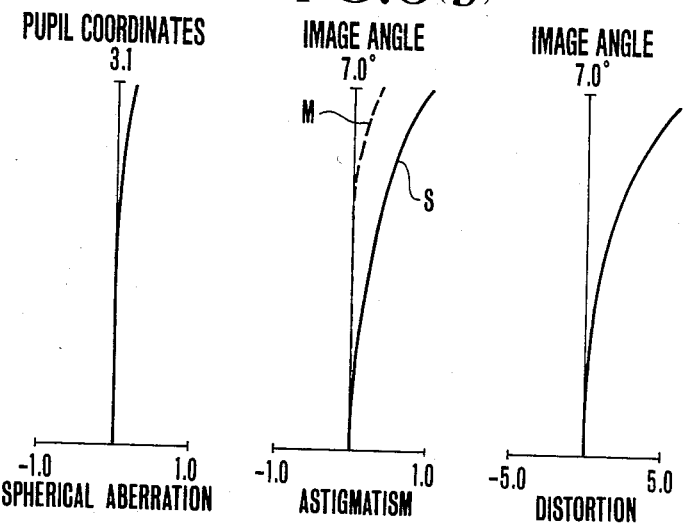
Figure 6B:
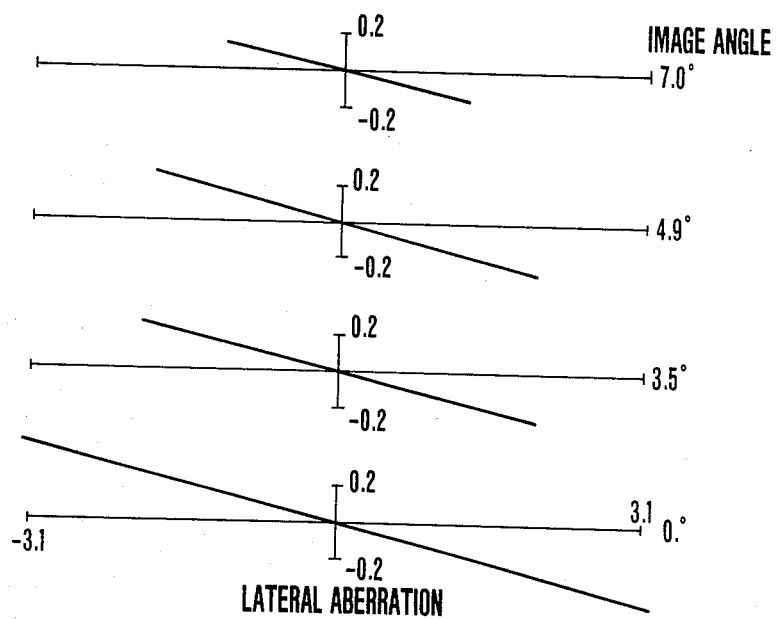
Figure 6C:
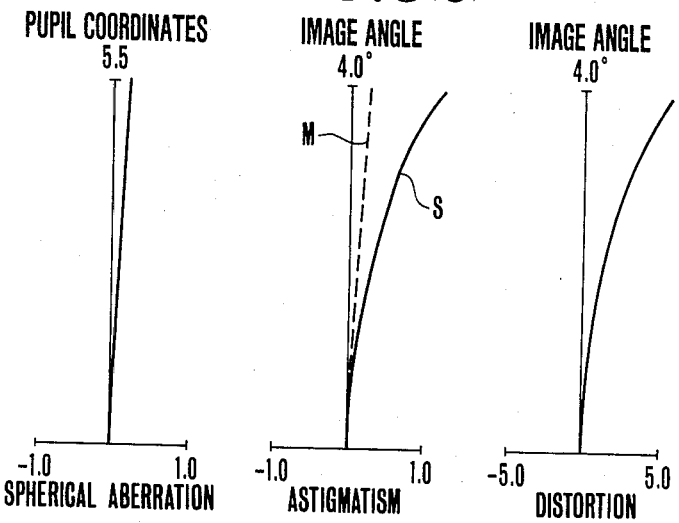
Figure 6C:
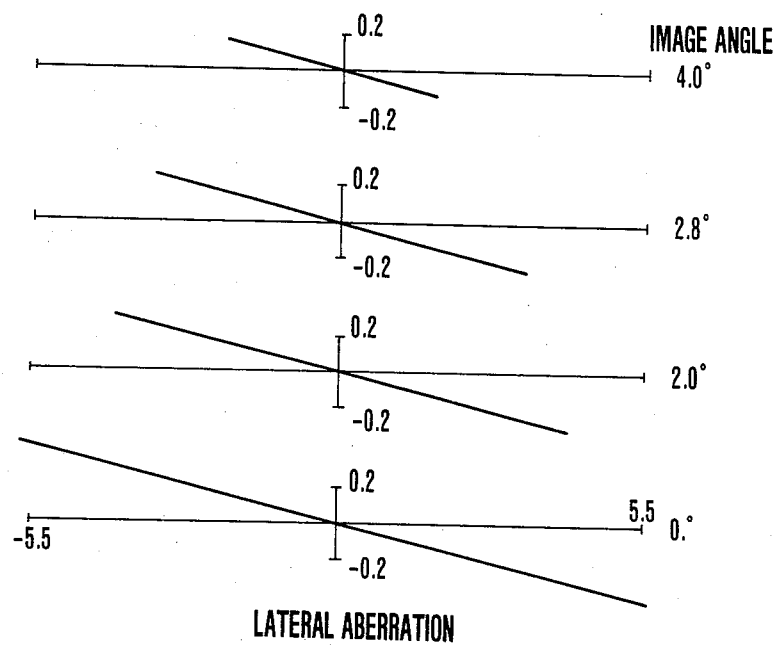
Figure 7B:
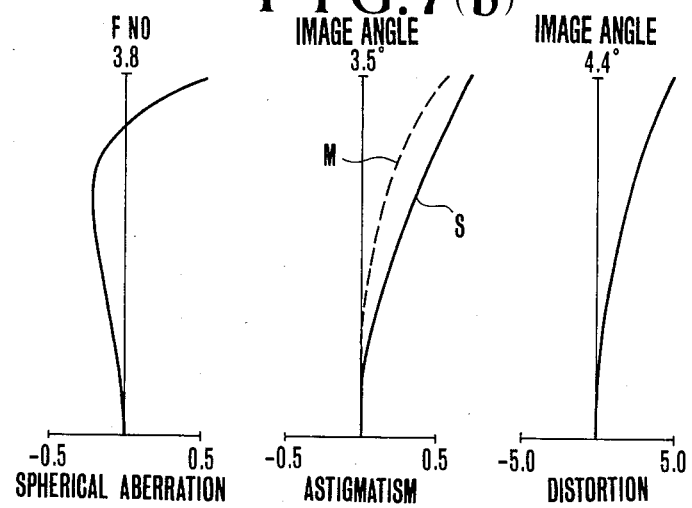
Figure 7B:
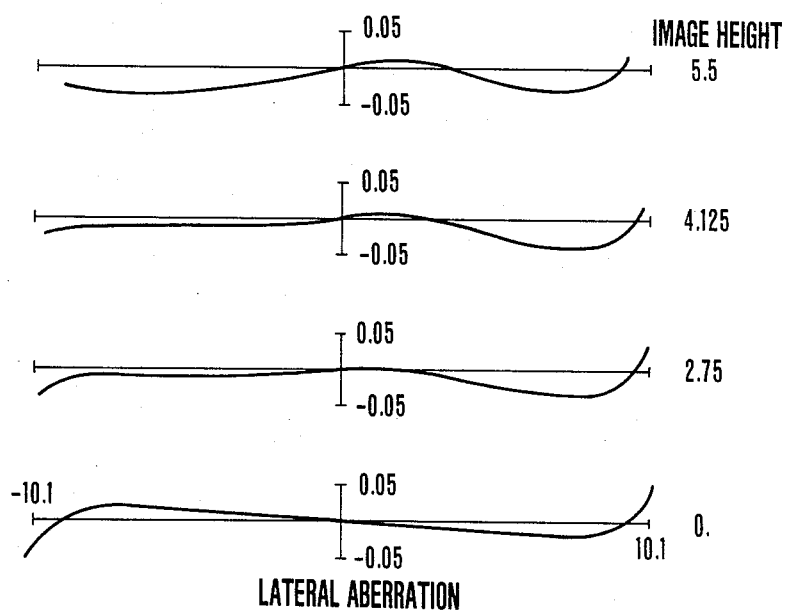
Figure 7C:
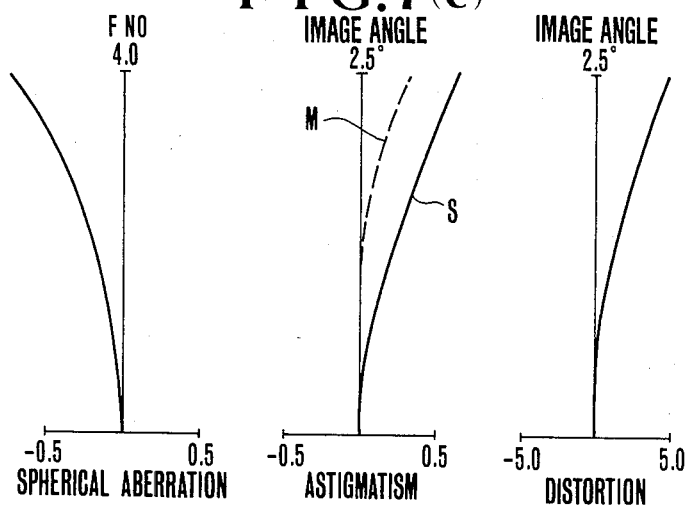
Figure 7C:
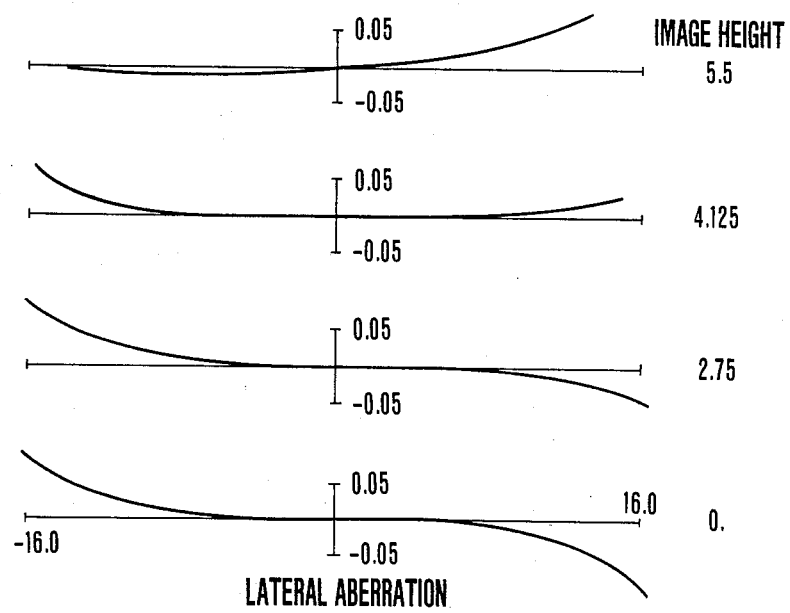
Figure 8A:
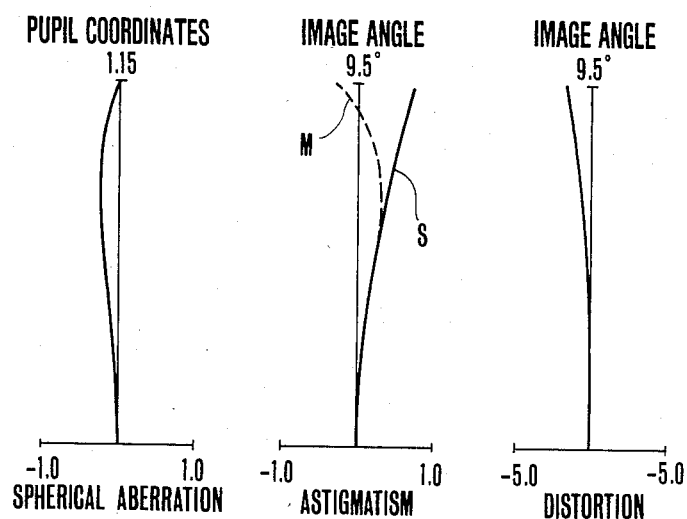
FIGS. 8(a) to 8(c) are graphic representations of the aberrations of the finder optical system of FIG. 4(b) in the shortest, intermediate and longest focal length positions respectively.
Figure 8A:
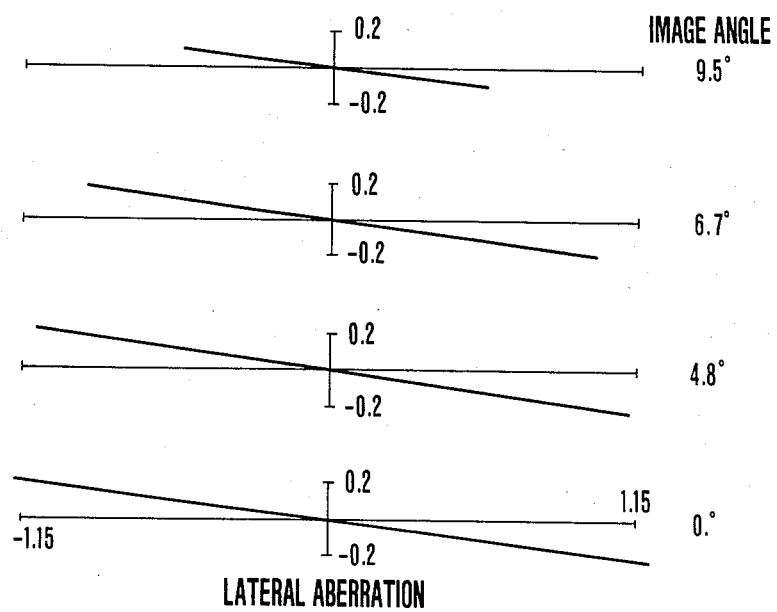
Figure 8B:
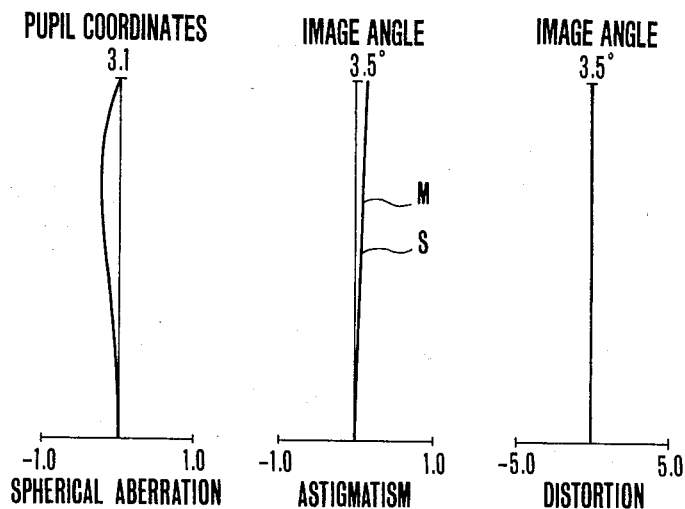
Figure 8B:
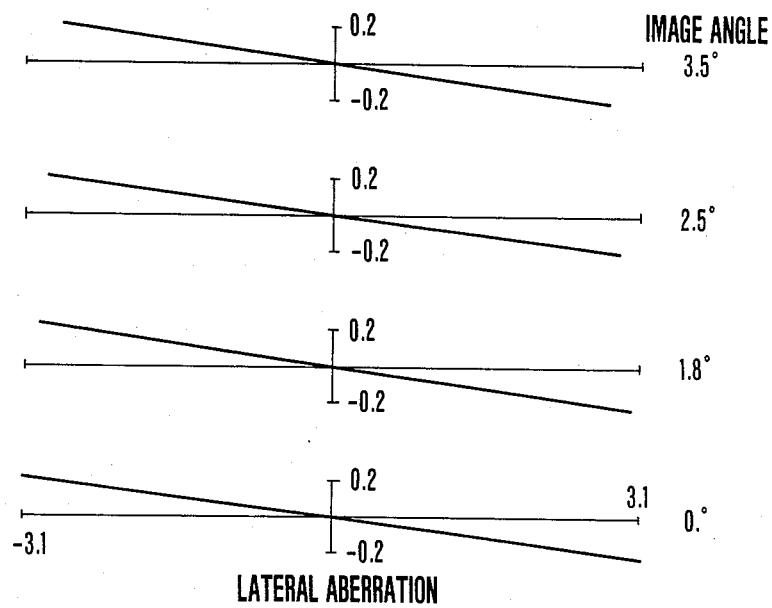
Figure 8C:
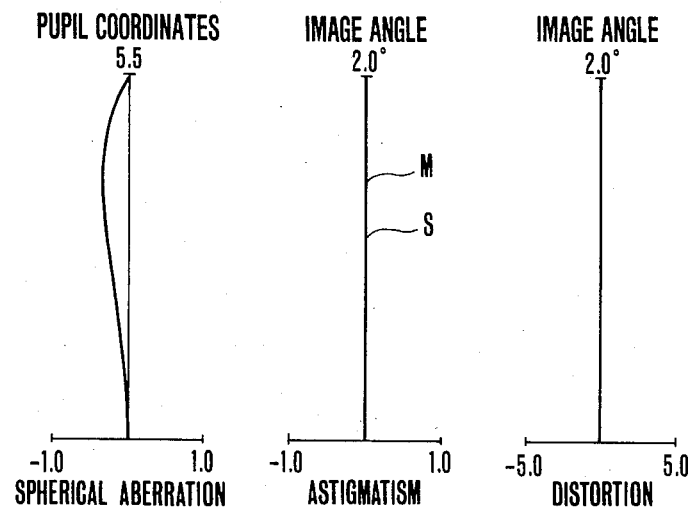
Figure 8C:
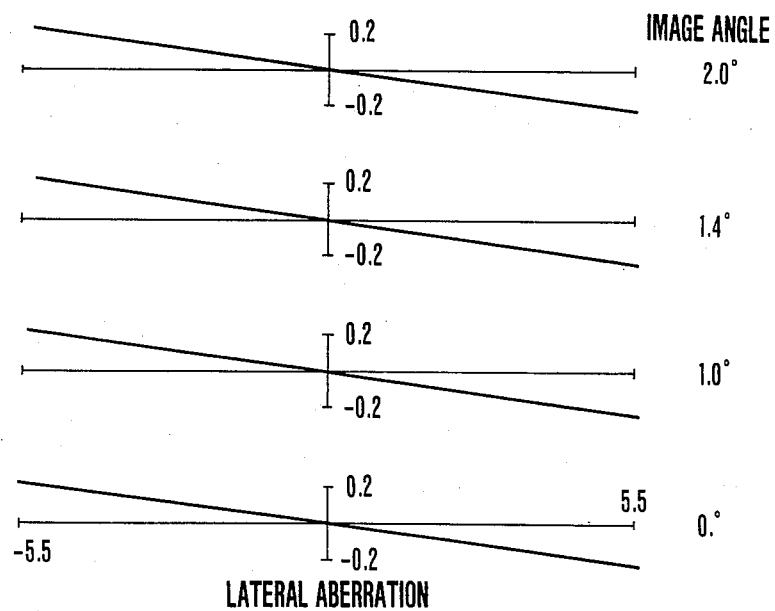

For its state of correction of the various aberrations over the zooming range, the photographic optical system in this example has spherical aberration, astigmatism, distortion and lateral aberration illustrated in FIGS. 5(a), 5(b) and 5(c), while those of the finder optical system are illustrated in FIGS. 6(a), 6(b) and 6(c). For note, in FIGS. 5 and 6, (a) is when in the shortest focal length position, (b) when in the intermediate focal length position and (c) when in the longest focal length position. Also S is the sagittal image surface and M is the meridional image surface.

Figure 4B:
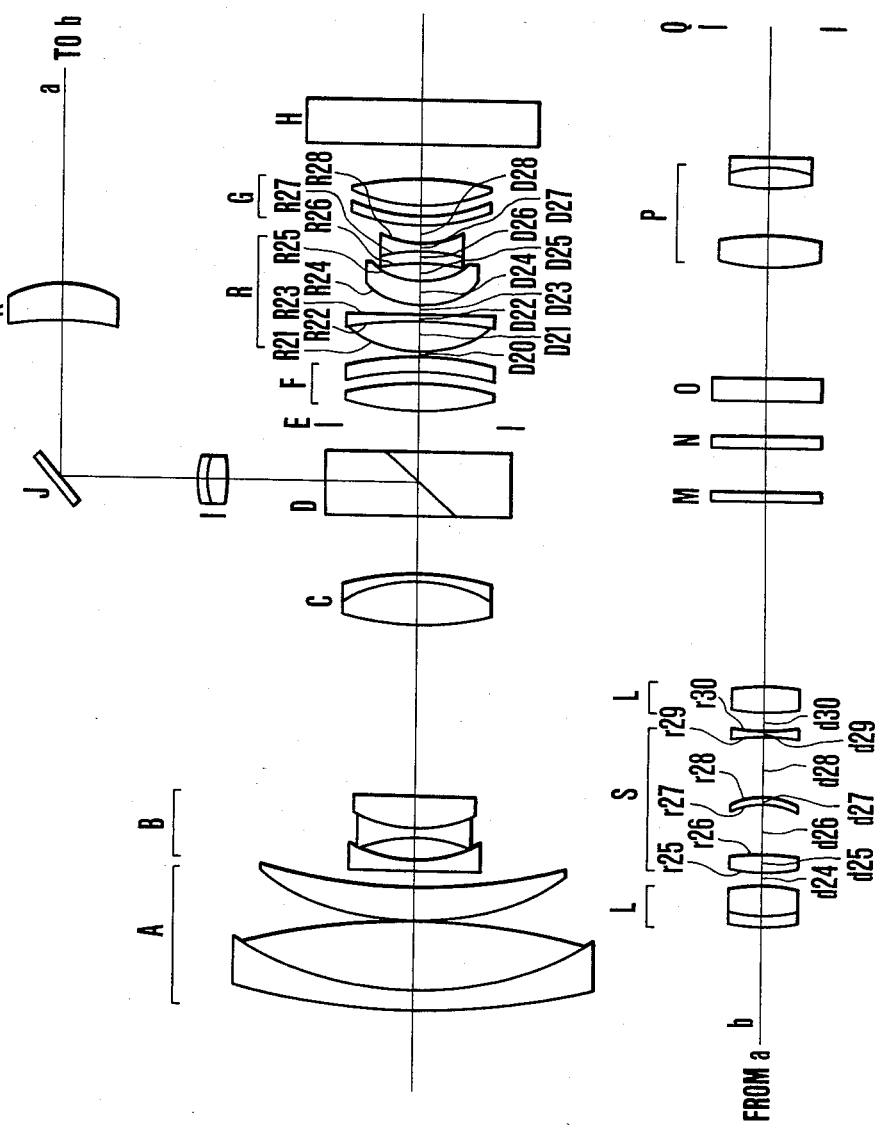

An example of specific extenders for the photographic and finder optical systems are shown in FIG. 4(b) and indicated at R and S respectively. In the finder optical system with inclusion of the extender S, an enlarged image is focused on the second plane P2. In this example, the extender R is situated in a space between the front and rear parts F and G of the relay lens, and the extender S in a space between two components of the erector lens L. The numerical data in accordance with which the extenders R and S can be constructed are listed in Tables 3 and 4 respectively with the symbols having the same meanings as those of Tables 1 and 2 have.

TABLE 3

| | | | |
|---|---|---|---|
| R20 = | D20 = 0.7 | | |
| R21 = 12.23 | D21 = 3.93 | N21 = 1.58913 | ν21 = 61.0 |
| R22 = −55.18 | D22 = 0.70 | N22 = 1.80518 | ν22 = 25.4 |
| R23 = 2376.61 | D23 = 1.52 | | |
| R24 = 10.34 | D24 = 2.06 | N23 = 1.88300 | ν23 = 40.8 |
| R25 = 7.00 | D25 = 2.67 | | |
| R26 = −17.23 | D26 = 1.45 | N24 = 1.80518 | ν24 = 25.4 |

TABLE 3-continued

| | | | |
|---|---|---|---|
| R27 = −14.39 | D27 = 0.53 | N25 = 1.65160 | ν25 = 58.6 |
| R28 = 6.78 | D28 = 2.44 | | |

| | Shortest Focal Length | Intermediate Focal Length | Longest Focal Length |
|---|---|---|---|
| f = | 26.68 | 72.05 | 126.76 |

TABLE 4

| | | | |
|---|---|---|---|
| r24 = | d24 = 1.90 | | |
| r25 = 19.15 | d25 = 2.00 | N25 = 1.53256 | ν25 = 45.9 |
| r26 = −94.21 | d26 = 6.00 | | |
| r27 = −6.55 | d27 = 0.70 | N26 = 1.74400 | ν26 = 44.7 |
| r28 = −6.74 | d28 = 7.40 | | |
| r29 = −18.13 | d29 = 0.50 | N27 = 1.80610 | ν27 = 40.9 |
| r30 = 24.43 | d30 = 2.00 | | |

| | Shortest Focal Length Position | Intermediate Focal Length Position | Longest Focal Length Position |
|---|---|---|---|
| Angular Magnification | 1.04 | 2.82 | 4.97 |

When, these extenders R and S are included in the photographic and finder optical systems, the various aberrations, namely, spherical aberration, astigmatism, distortion and lateral aberrations of the resultant systems in the wide angle, middle and telephoto positions are shown in FIGS. 7(a), 7(b) and 7(c) and FIGS. 8(a), 8(b) and 8(c) respectively.

As has been described in greater detail above, according to the present invention, for the camera having the photographic optical system with an extender upon attachment at either the rear or an intermediate space thereof to change the focal length of the photographic optical system, the possibility of correcting the field of view of the finder rightly in response to change of the focal length of the photographic optical system can be realized. According to the present invention, it is also made possible to achieve the realization of the camera having such capabilities without involving an unduly large increase in the bulk and size and weight.

What we claim:
1. An optical system for a camera comprising:
   (a) a photographic optical system;
   (b) a finder optical system;
   (c) a beam splitter for dividing the light from said photographic optical system into two parts one of which goes to an image pickup plane of the camera and the other of which is directed to said finder optical system;
   (d) an image magnification changing optical system for changing the value of the focal length of said photographic optical system to another, said image magnification changing optical system being arranged to move into or retract from, an optical path between said beam splitter and the image pickup plane of the camera; and
   (e) a correction optical system for correcting the field of view of said finder optical system, said correction optical system being arranged to move in response to movement of said image magnification changing optical system, while changing the size of an image of said finder optical system.
2. An optical system for a camera according to claim 1, wherein said correction optical system is arranged to be movable into or retractable from an optical path of said finder optical system.

3. An optical system for a camera according to claim 2, wherein said correction optical system lies in an optical path of said finder optical system upon changing of its position to change the magnification of the image at the same rate as that of magnification of said image magnification changing optical system.

4. An optical system for a camera according to claim 1, wherein said correction optical system is used as a portion of said finder optical system and is arranged to be able to change its position along an optical axis of said finder optical system.

5. An optical system for a camera according to claim 4, wherein said correction optical system changes its position between two points where its magnification power takes values of $-1/\sqrt{a}$ and $-\sqrt{a}$ respectively wherein "a" is the magnification power of said image magnification changing optical system.

6. An optical system for a camera according to claim 4, wherein said correction optical system includes a cemented lens consisting of a positive element and a negative element.

* * * * *

UNITED STATES PATENT AND TRADEMARK OFFICE
CERTIFICATE OF CORRECTION

PATENT NO.   :   4,544,250
DATED        :   October 1, 1985
INVENTOR(S)  :   Kazuo Tanaka, et al It is certified that error appears in the above-identified patent and that said Letters Patent is hereby corrected as shown below:

In the heading of the patent it should read as follows:

--[30]  Foreign Application Priority Data
   May 27, 1983 [JP]    Japan..........58-80988
   May 27, 1983 [JP]    Japan..........58-94561 --

Signed and Sealed this

Twenty-ninth Day of July 1986

[SEAL]

Attest:

DONALD J. QUIGG

Attesting Officer    Commissioner of Patents and Trademarks